United States Patent
Aslot et al.

(10) Patent No.: US 8,880,858 B2
(45) Date of Patent: Nov. 4, 2014

(54) ESTIMATION OF BOOT-TIME MEMORY REQUIREMENT

(75) Inventors: Vishal Chittranjan Aslot, Austin, TX (US); Adekunle Bello, Austin, TX (US); Liang Jiang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 13/102,497

(22) Filed: May 6, 2011

(65) Prior Publication Data

US 2012/0284496 A1    Nov. 8, 2012

(51) Int. Cl.
*G06F 12/00* (2006.01)
*G06F 9/44* (2006.01)
*G06F 9/445* (2006.01)

(52) U.S. Cl.
CPC .......... *G06F 9/4401* (2013.01); *G06F 9/44505* (2013.01)
USPC ................... 713/1; 713/2; 713/100; 711/170; 711/172; 711/173

(58) Field of Classification Search
USPC .................. 713/1, 2, 100; 711/170, 172, 173
See application file for complete search history.

(56) References Cited

U.S. PATENT DOCUMENTS

| 5,748,957 | A | 5/1998 | Klein |
| 6,463,531 | B1 | 10/2002 | Aguilar et al. |
| 7,082,509 | B2 | 7/2006 | Zimmer et al. |
| 7,203,830 | B2 | 4/2007 | Fortin et al. |
| 7,409,584 | B2 | 8/2008 | Denninghoff et al. |
| 2007/0300036 | A1* | 12/2007 | Abbey ......................... 711/173 |
| 2008/0022033 | A1 | 1/2008 | Atherton et al. |

* cited by examiner

*Primary Examiner* — M Elamin
(74) *Attorney, Agent, or Firm* — Garg Law Firm, PLLC; Rakesh Garg; Mark C. Vallone

(57) ABSTRACT

Illustrative embodiments include a method, system, and computer program product for estimating boot-time memory requirement of a data processing system. A data processing system identifies, using system configuration information associated with the data processing system, a set of components needed for booting up the data processing system. The data processing system determines a dependency of a component identified in the set of components, the component including a memory estimator program. The data processing system determines an ancestry of the component identified in the set of components. The data processing system receives, using the memory estimator program of the component, a boot-time memory requirement of the component. The data processing system calculates a total boot-time memory requirement. The data processing system determines whether an amount of real memory of the data processing system satisfies the total boot-time memory requirement.

23 Claims, 8 Drawing Sheets

ESTIMATION OF BOOT-TIME MEMORY REQUIREMENT

TECHNICAL FIELD

The present invention relates generally to a method, system, and computer program product for successfully booting a data processing system. More particularly, the present invention relates to a method, system, and computer program product for estimating the boot-time memory requirement in a data processing system.

BACKGROUND

Data processing systems include memory devices for storing, processing, and moving data. A memory device, or memory, is generally a physical component of a data processing system configured to store data. A memory may also include logical or virtual components, such as a space on a hard disk designated to be used as a part of the memory.

Real memory is the amount of memory available on a physical memory device, excluding any logical or virtual memory structures. A data processing system needs memory to perform an operation, including starting from a power-off mode or shutdown status. A boot process, or booting up, is the process of bringing a data processing system from a power-off mode or a shutdown status to a point where the operating system is successfully loaded and the data processing system is operational for performing additional tasks. In some cases, the successful loading of the operating system presents a command prompt to a user, and in other cases, the boot process may couple with other processes, such as to present a graphical user interface to a user, launch certain applications, or establish communications with certain entities over a data network.

Memory is an essential part of the boot process. Particularly, some amount of real memory is required for loading certain components of an operating system so that the boot process may complete and the data processing system may become operational for the desired purpose.

Data processing systems can be configured in a variety of ways. For example, the components in a data processing system may be configured to operate in a manner such that parts of the data processing system behave as separate data processing units. The memory in such a configuration can be associated with a single data processing unit and can be used for the boot process, such as to load components of the data processing unit's operating system.

As another example, data processing systems can be divided into logical partitions (LPARs). Such data processing systems are also known as logically partitioned data processing systems. A logical partition is also known simply as a "partition." Each partition operates as a separate data processing system independent of the other partitions. Generally, a partition management firmware component manages the various partitions and provides the network connectivity among them. A Hypervisor is an example of such a partition management firmware. Memory in such configurations is divided and allocated to the various partitions. A partition's boot process uses the memory allocated to that partition to load the operating system image for that partition.

SUMMARY

The illustrative embodiments provide a method, system, and computer program product for estimating boot-time memory requirements in a data processing system. An embodiment identifies, using system configuration information associated with the data processing system, a set of components needed for booting up the data processing system. The embodiment determines a dependency of a component identified in the set of components, the component including a memory estimator program. The embodiment determines an ancestry of the component identified in the set of components. The embodiment receives, using the memory estimator program of the component, a boot-time memory requirement of the component. The embodiment calculates a total boot-time memory requirement. The embodiment determines whether an amount of real memory of the data processing system satisfies the total boot-time memory requirement.

Another embodiment includes one or more computer-readable tangible storage devices, and program instructions stored on at least one of the one or more storage devices. The program instructions of the embodiment include first program instructions to identify, using system configuration information associated with the data processing system, a set of components needed for booting up the data processing system; second program instructions to determine a dependency of a component identified in the set of components, the component including a memory estimator program; third program instructions to determine an ancestry of the component identified in the set of components; fourth program instructions to receive, using the memory estimator program of the component, a boot-time memory requirement of the component; fifth program instructions to calculate a total boot-time memory requirement; and sixth program instructions to determine whether an amount of real memory of the data processing system satisfies the total boot-time memory requirement.

Another embodiment includes one or more processors, one or more computer-readable memories, one or more computer-readable tangible storage devices, and program instructions stored on at least one of the one or more storage devices for execution by at least one of the one or more processors via at least one of the one or more memories. The program instructions according to the embodiment include first program instructions to identify, using system configuration information associated with the data processing system, a set of components needed for booting up the data processing system; second program instructions to determine a dependency of a component identified in the set of components, the component including a memory estimator program; third program instructions to determine an ancestry of the component identified in the set of components; fourth program instructions to receive, using the memory estimator program of the component, a boot-time memory requirement of the component; fifth program instructions to calculate a total boot-time memory requirement; and sixth program instructions to determine whether an amount of real memory of the data processing system satisfies the total boot-time memory requirement.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
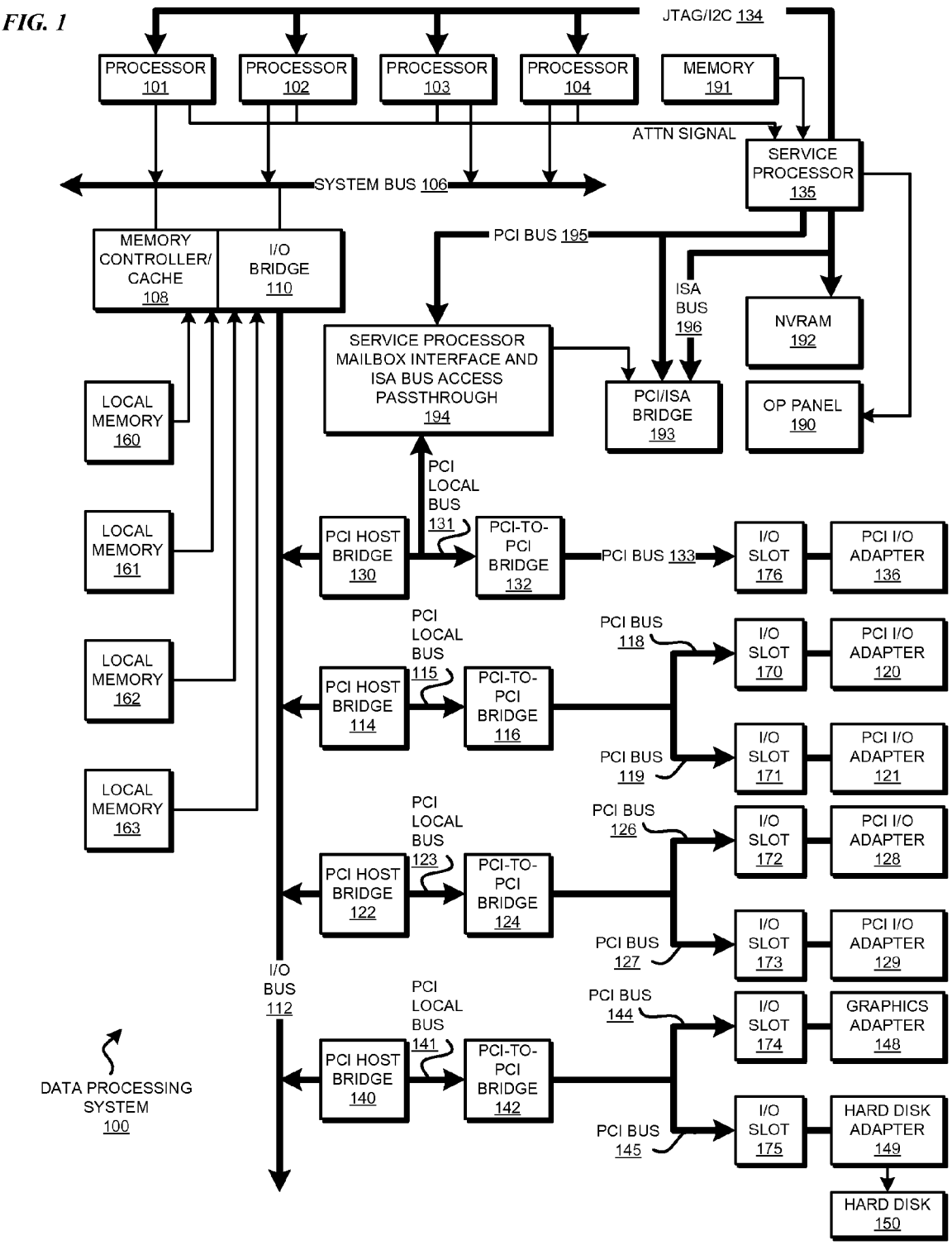
FIG. 1 depicts a block diagram of a data processing system in which the illustrative embodiments may be implemented.

The invention recognizes that a data processing system often fails to boot up, that is, the data processing system's operating system fails to load during the boot process, due to the insufficiency of the available real memory in the data processing system. For example, a boot process may start and attempt to load certain components of the operating system that are identified in the boot image, but fail because a component cannot be loaded in the available real memory. A boot image is code that is executed during the boot process of a data processing system to load the operating system and make the data processing system operational for the desired purpose.

The invention recognizes that a boot process failure is especially likely after the configuration of the data processing system has been changed. For example, a data processing system may have been operating with a certain amount of memory and a certain number of processors. An administrator or an application may reconfigure the data processing system to operate with a reduced amount of memory and reboot the data processing system. The reduced amount of memory may be used up before a particular kernel module of the operating system can be loaded, thereby causing the boot process to fail.

The invention recognizes that presently, whether a boot process will progress through successful completion is not determinable with certainty in advance of the booting up. Presently, an administrator realizes that the configured amount of real memory in the data processing system is insufficient for the boot process after the boot process progresses partially and fails. The administrator is not notified in advance of beginning the boot process that the boot process is unlikely to complete with a given configuration of a given data processing system, especially when the amount of real memory configured in the data processing system is going to be insufficient for the boot process.

In some presently used operating systems, a size of the boot image is used as a measure of the real memory needed for the boot process. The invention recognizes that the size of the boot image is an insufficient determiner of the size of real memory required for a successful completion of the boot process. The invention recognizes this problem because the boot image size does not account for, and is not representative of, the amount of memory used at runtime by the kernel modules and module extensions that load during the boot process. For example, the size of a kernel module only informs about the amount of memory needed for storing the module's image, but not about the amount of memory the module dynamically allocates once loaded.

In another presently used methodology, a memory usage from a previous operation of the data processing system is used as an amount of memory needed for the boot process. The invention recognizes that such a "high watermark" amount of memory is also misleading for configuring sufficient real memory for a successful boot process. For example, after changing a configuration of a data processing system, an administrator may also change the boot image. As an example, the new configuration may use more devices in the data processing system, new features of the operating system, change the tunable aspects of the operating system, and make other similar changes that alter the memory usage during boot up. A previous high watermark memory usage may have been sufficient to operate the data processing system as previously configured, but may be insufficient to boot up the data processing system with the altered configuration.

Therefore, the invention recognizes that estimating the boot-time memory requirements is a non-trivial problem. The estimate of the boot-time memory requirements has to be accurate enough such that every boot up after the first boot up of a data processing system either is successful, or informs about the real memory deficiency prior to initiating the boot process.

The illustrative embodiments used to describe the invention generally address and solve the above-described problems and other problems related to boot-time memory requirements in a data processing system. The illustrative embodiments provide a method, system, and computer program product for estimating boot-time memory requirements in a data processing system.

According to an embodiment of the invention, components of an operating system, including but not limited to kernel modules, module extensions, and device drivers, are configured or modified to respond to queries from a memory estimator application according to an embodiment. A component configured or modified in this manner may further inform the memory estimator application about the modified component's dependencies. A first component has a dependency on a second component when the first component requires the second component for the first component's operation, such as when the second component provides a function used by the first component. For example, a modified kernel module according to an embodiment may inform the memory estimator application of an embodiment that the modified kernel module needs another kernel module to be loaded into memory as well for a successful boot process.

Furthermore, according to an embodiment, boot configuration information, such as a boot image, provides information about the components that participate in the boot process, such information including information about an ancestry of the components. Ancestry of a component is a set of devices or components that must be activated as a consequence of needing the component. For example, the boot image may inform that component "abc" of the operating system has to be loaded during boot-time. The code for component abc may reside on a hard disk, from where the component will be loaded during boot-time. The hard disk may be a SCSI disk on a PCI bus. Consequently, the ancestry of component abc includes the device driver to operate the hard disk, the component to operate the SCSI, and the component to operate the PCI bus, which must all be loaded so that component abc can be loaded.

The illustrative embodiments are described with respect to certain data and data structures only as examples. Such descriptions are not intended to be limiting on the invention. For example, an illustrative embodiment described with respect to a page of memory can be implemented with a smaller or larger unit of memory within the scope of the invention.

Furthermore, the illustrative embodiments may be implemented with respect to any type of data, data source, or access to a data source over a data network. Any type of data storage device may provide the data, such as a boot image, to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of data storage resource, such as a physical or virtual data storage device, that may be available in a given data processing system configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
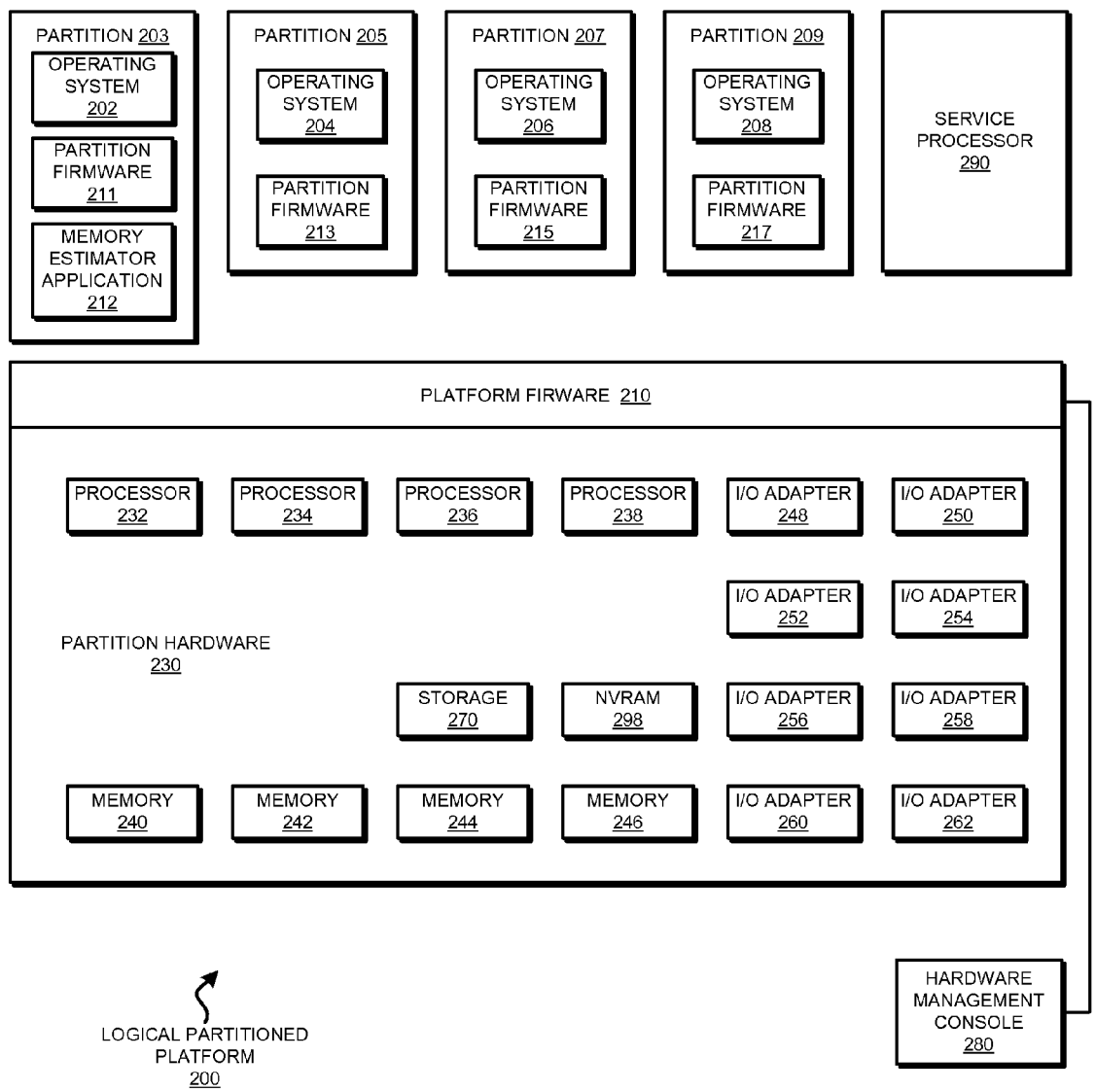
FIG. 2 depicts a block diagram of an example logically partitioned platform in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed and processors 101, 102, 103, and 104 may be cores in the single processor chip. Alternatively, data processing system 100 may include processors 101, 102, 103, 104 in any combination of processors and cores.

Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned among the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

Memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, PCI bus 145 connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. PCI local bus 131 also connects PCI host bridge 130 to service processor mailbox interface and ISA bus access pass-through logic 194 and PCI-to-PCI bridge 132.

Service processor mailbox interface and ISA bus access pass-through logic 194 forwards PCI accesses destined to PCI/ISA bridge 193. NVRAM storage 192 connects to ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/ scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Service processor 135 gathers and reports any error information for failures detected during the BISTs, BATs, and memory tests.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memories 160-163. While host processors 101-104 are executing code from respective operating systems within data processing system 100, service processor 135 enters a mode of monitoring and reporting errors. Service processor 135 monitors types of items including, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a resource, such as a processor's cache memory, and decide that the errors are predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logically partitioned platform in which the illustrative embodiments may be implemented. The hardware in logically partitioned platform 200 may be implemented as, for example, the corresponding components depicted in data processing system 100 in FIG. 1.

Logically partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logically partitioned platform 200. These operating systems may be implemented using IBM-i, which is designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209, respectively.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, partitions 203, 205, 207, and 209 also include partition firmware 211, 213, 215, and 217, respectively. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, platform firmware 210 loads a copy of boot strap code onto partitions 203, 205, 207, and 209. Thereafter, control is transferred to the boot strap code, with the boot strap code then loading the open firmware and RTAS. The processors associated or assigned to the partitions are then dispatched to the partition's memory to execute the partition firmware.

Partition 203 includes memory estimator application 212. Memory estimator application 212 comprises program instructions for carrying out the processes of any of the various embodiments. The program instructions may be stored on at least one of one or more computer-readable tangible storage devices (e.g., hard disk 150, NVRAM 192, or a compact disk device coupled with I/O bus 112 in FIG. 1), for execution by at least one of one or more processors (e.g., processors 101-104 in FIG. 1) via at least one of one or more computer-readable memories (e.g., any of local memories 160-163 in FIG. 1). Memory estimator application 212 may be implemented in any form, including but not limited to a form suitable for execution as a service, a form implemented using hardware and software, or a form suitable for integration into another application for memory management.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned among partitions 203, 205, 207, and 209 within logically partitioned platform 200, each of which partitions 203, 205, 207, and 209 corresponds to one of operating systems 202, 204, 206, and 208.

Partition management firmware 210 performs a number of functions and services for partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logically partitioned platform 200.

Service processor 290 may be used to provide various services, such as processing of platform errors in the partitions. These services also may act as a service agent to report errors back to a vendor, such as International Business Machines Corporation. Operations of partitions 203, 205, 207, and 209 may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

Figure 3:
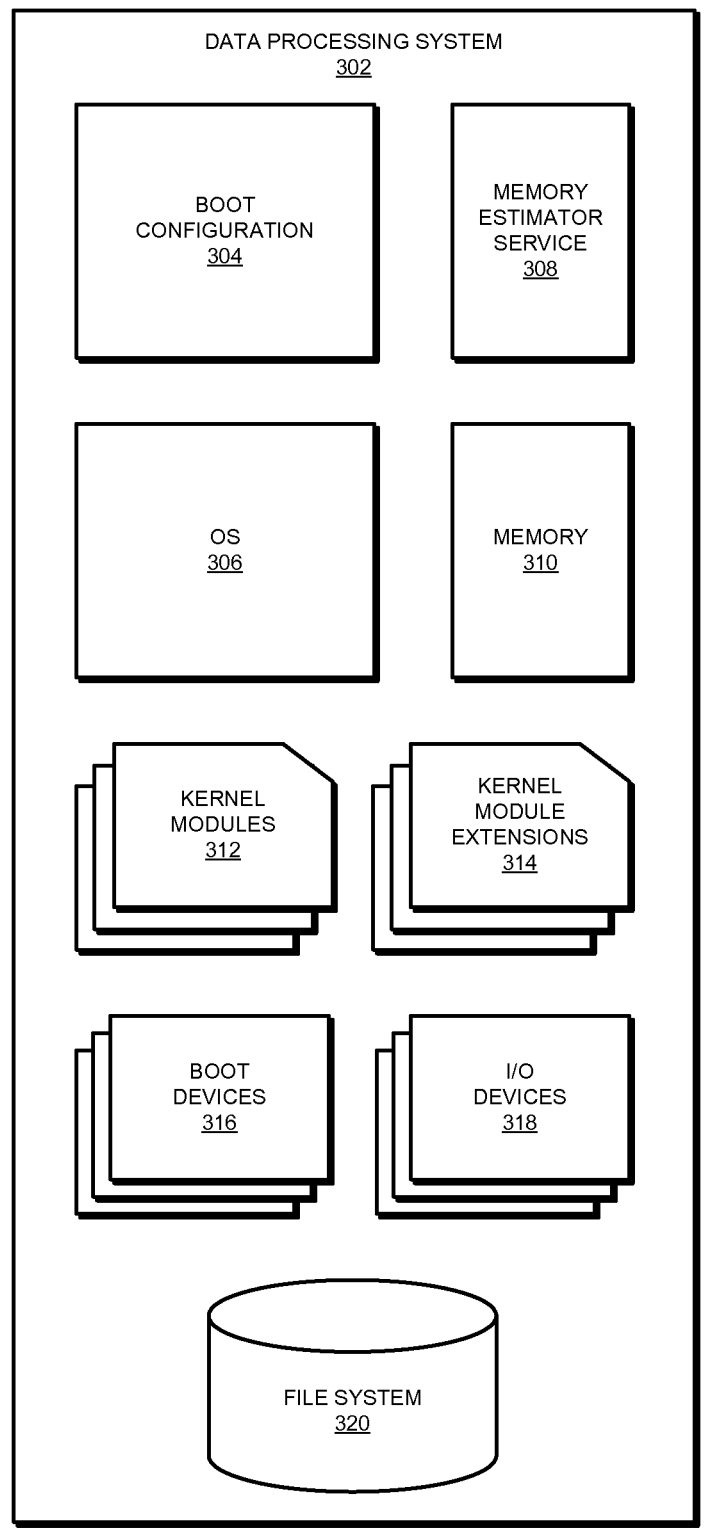
FIG. 3 depicts a block diagram of a data processing system configured for estimating boot-time memory requirements in accordance with an illustrative embodiment.

With reference to FIG. 3, this figure depicts a block diagram of a data processing system configured for estimating boot-time memory requirements in accordance with an illustrative embodiment. Data processing system 302 may be a stand-alone data processing system or a partition, such as partition 203 in FIG. 2.

Data processing system 302 includes boot configuration 304, which contains information for loading operating system 306 during the boot process. In one embodiment, boot configuration 304 includes the code that generates a boot image. In another embodiment, boot configuration 304 may include the boot image.

Memory estimator service 308 is an embodiment of memory estimator application 212 in FIG. 2 and is configured to execute as a service as an example. Memory 310 is the real memory allocated to data processing system 302. Kernel modules 312 are components of operating system 306 that must be loaded during boot up. Kernel module extensions 314 are components of operating system 306, some of which are optionally loaded during boot up.

Boot devices 316 are devices that have to be activated during the boot process. For example, if the boot image is stored on a SCSI hard disk—hdisk0, then hdisk0 and the parent SCSI device, e.g., SCSI2, are examples of boot devices 316.

I/O devices 318 are input/output devices, such as a keyboard and a monitor, that are available in data processing system 302. File system 320 is information about a data repository that stores the data or code of a component to be loaded during the boot process. For example, if one of kernel modules 312 is stored in an /etc directory, then the description of "/" and "/etc" file systems is available in file system 320. In the UNIX operating system, information about /, /etc, /var, /home, and other file systems can be obtained from /etc/fstab or /etc/filesystems file.

Figure 4:
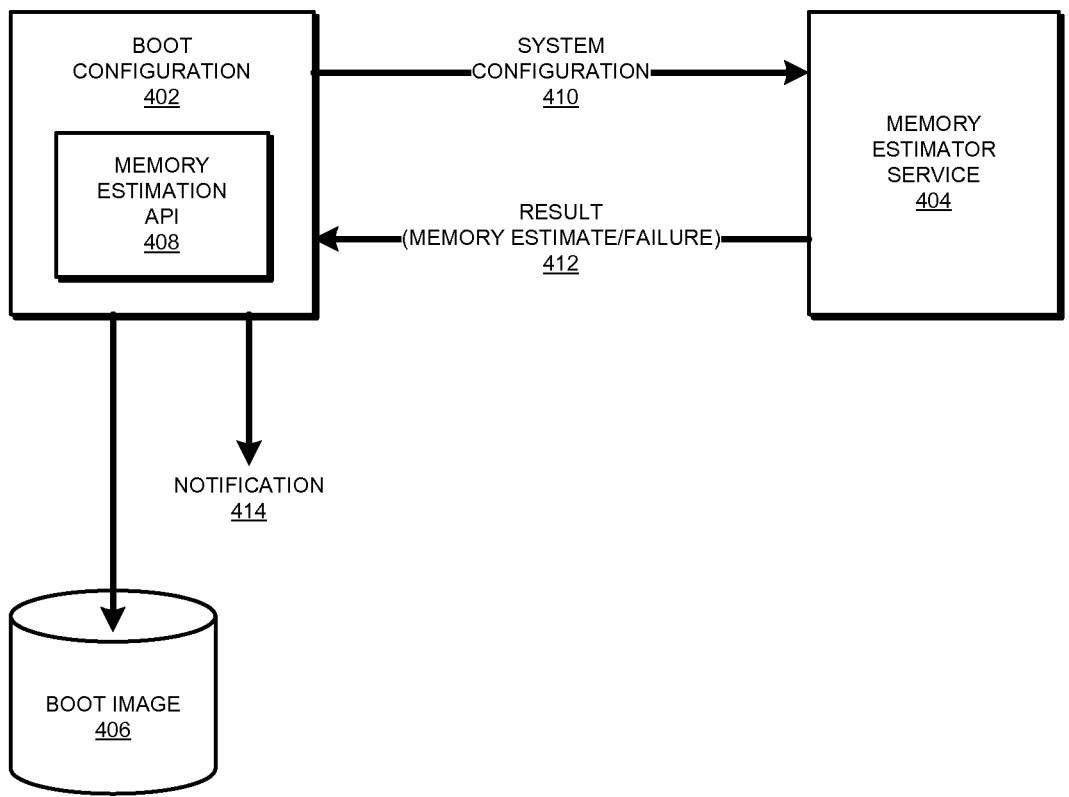
FIG. 4 depicts a block diagram of a modified boot configuration for estimating boot-time memory requirements in accordance with an illustrative embodiment.

With reference to FIG. 4, this figure depicts a block diagram of a modified boot configuration for estimating boot-time memory requirements in accordance with an illustrative embodiment. Boot configuration 402 may be analogous to boot configuration 304 in FIG. 3. Memory estimator service 404 may be analogous to memory estimator service 308 in FIG. 3.

In the depicted embodiment, boot configuration 402 may include code that generates boot image 406. Modified according to an embodiment, boot configuration 402 includes memory estimation application program interface (API) 408. Generally, an API described with respect to any embodiment may be implemented in any manner suitable for a given data processing environment. Furthermore, while an embodiment may be described with respect to one API, an implementation may use a set of APIs for accomplishing a similar purpose without departing the scope of the invention. As some examples, an API may be implemented as a class method, a function, a system call, a pointer, an address, a data structure, or another suitable structure within the scope of the invention.

Using memory estimation API 408, boot configuration 402 sends system configuration information 410 to memory estimation service 404. In one embodiment, system configuration information 410 includes a list of boot devices available in a corresponding data processing system, a list of I/O devices available in the data processing system, an amount of real memory configured in the data processing system, or a combination thereof.

System configuration information 410 may further include information about any tunable aspects of the operating system of the data processing system. For example, an operating system may allow adjusting, or tuning, a kernel page size, heap page size, dynamic memory allocation alignment, or non-pageable memory limits, as tunable aspects of the operating system.

System configuration information 410 may further include information about a file system that may be needed for booting the data processing system. For example, in one embodiment, the information about the file system may be a location identifier where the description of one or more file systems resides. In another embodiment, the information about the file system may be the description of one or more file systems needed for booting the data processing system.

Memory estimator service 404 returns result 412 to boot configuration 402 in response to receiving system configuration information 410. Result 412 is generated using system configuration information 410 as well as the information received from other components as described elsewhere in the disclosure. Result 412 may further include, or be based on, information computed by memory estimator service 404.

For example, result 412 may inform boot configuration 402 whether or not the amount of real memory configured in the data processing system is sufficient to successfully boot the data processing system. Result 412 may also include an estimate of the boot-time memory requirement along with an indication of success or failure of the boot process.

Using result 412, boot configuration 402 may generate boot image 406 or notification 414. For example, if result 412 indicates that the boot process, if executed, will progress successfully to completion with the configured real memory, boot configuration 402 may proceed to generate boot image 406. On the other hand, if result 412 indicates that the boot process, if executed, will fail due to the insufficiency of the configured real memory, boot configuration 402 may generate notification 414, which may include an error message. Optionally, the error message may further identify the amount of memory that is needed, amount of memory presently configured, and/or the deficiency that prevents a successful boot up.

Furthermore, notification 414 may be transmitted to an administrator, logged in a file, communicated to an application, or a combination thereof (not shown). For example, notification 414 may be communicated to a memory configuration application that may be able to allocate more memory to the data processing system in response to receiving notification 414. As an example, if the data processing system was configured with four gigabytes (GB) of memory and result 412 included a memory estimate of five GB, notification 414 may cause a memory allocation application (not shown) to increase the allocated memory from four GB to the required five GB, or to eight GB if memory can only be allocated in certain increments, e.g., four GB, in the data processing environment.

Figure 5:
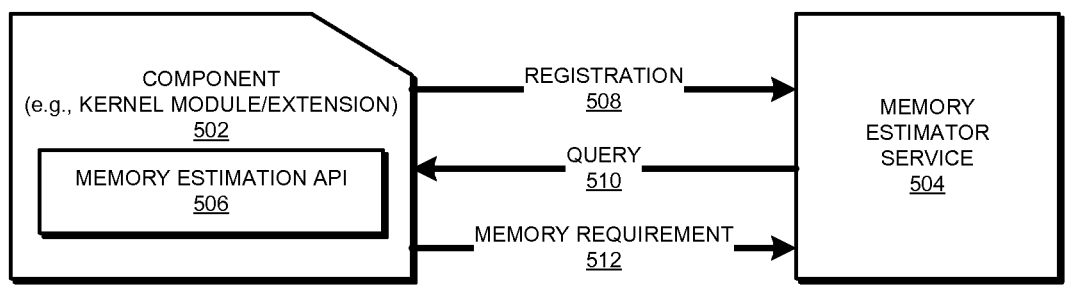
FIG. 5 depicts a block diagram of a modified component of an operating system usable for estimating boot-time memory requirements in accordance with an illustrative embodiment.

With reference to FIG. 5, this figure depicts a block diagram of a modified component of an operating system usable for estimating boot-time memory requirements in accordance with an illustrative embodiment. Component 502 may be implemented as any of kernel modules 312 or kernel module extensions 314 in FIG. 3. Component 502 is depicted as a kernel module or a kernel module extension only as an example and not as a limitation on the invention. Any component of an operating system that has to be loaded during boot-time can be modified in the manner depicted without limitation. Memory estimation service 504 may be analogous to memory estimation service 404 in FIG. 4, and may similarly be a service-oriented embodiment of memory estimator application 212 in FIG. 2.

Component 502 includes memory estimation API 506. Using API 506, component 502 registers with memory estimator service 504 by sending registration 508. In one embodiment, registration 508 may include information identifying component 502, API 506, or a combination thereof. In another embodiment, registration 508 may also combine information identifying component 502's one or more dependencies. In another embodiment, registration 508 may further combine information identifying APIs analogous to API 506 that may exist in those dependencies.

Using API 506, memory estimator service 504 sends query 510 to component 502. Query 510 requests component 502 to provide a value, the value representing component 502's memory requirements. Component 502 returns memory requirement 512 in response to query 510.

In one embodiment, component 502 may store a value of memory requirement 512, such as in a specification, attribute, or register. In another embodiment, component 502 may compute the value of memory requirement 512, such as by maintaining a history of memory usage by component 502, and computing memory requirement 512 using such historical information.

Furthermore, component 502 may have different memory requirements for boot-time operations and operations during other times. In such a case, memory requirement 512 represents component 502's boot-time memory requirement.

Figure 6:
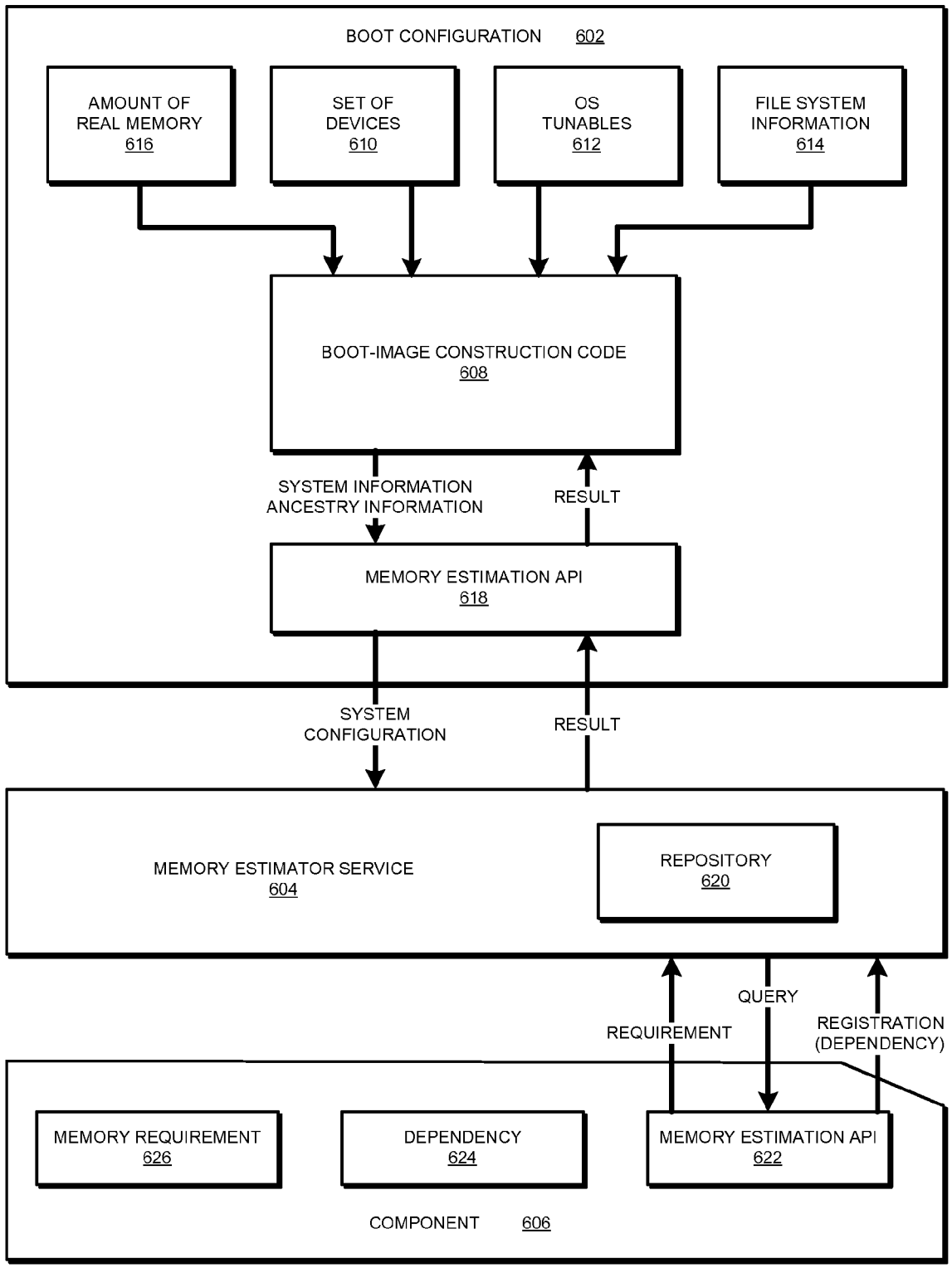
FIG. 6 depicts a block diagram of a configuration of estimating boot-time memory requirements in accordance with an illustrative embodiment.

With reference to FIG. 6, this figure depicts a block diagram of a configuration of estimating boot-time memory requirements in accordance with an illustrative embodiment. Boot configuration 602 may be analogous to boot configuration 402 in FIG. 4. Memory estimator service 604 may be analogous to memory estimator service 504 in FIG. 5, and may similarly be a service-oriented embodiment of memory estimator application 212 in FIG. 2. Component 606 may be analogous to component 502 in FIG. 5.

Boot configuration 602 may include, or communicate with, boot image construction code 608. Boot configuration 602 provides information about set of devices 610, which is required for the boot process. For example, set of devices 610 may be a minimum list of those devices that are necessary for booting the data processing system.

Boot configuration 602 further provides to boot image construction code 608, information describing any operating system tunables 612 and file system information 614 usable in a boot process. Amount of real memory 616 indicates the real memory configured in the data processing system and available for the boot process.

Set of devices 610, operating system tunables 612, file system information 614, and amount of real memory 616 are only example pieces of information depicted here for the clarity of the disclosure. In any particular implementation, boot image construction code 608 may receive more information, less information, or different information for a similar purpose within the scope of the invention.

Boot image construction code 608 interacts with memory estimator API 618. API 618 may be functionally similar to API 408 in FIG. 4. Boot image construction code 608 sends system information and any ancestry information to API 618. For example, set of devices 610 may identify hard disk hdisk0 as a device necessary for the boot process, for example, because a part of the file system of file system information 614 may reside on hdisk0. Furthermore, hdisk0 may be a SCSI drive whose parent SCSI device may be SCSI2 on a PCI bus in the data processing system. Thus, boot image construction code 608 supplies not only the system configuration information gleaned from set of devices 610, operating system tunables 612, file system information 614, and amount of real memory 616, but also any ancestry information related to any device, component, or object indentified in such system information.

Using the system information and ancestry information, memory estimator API 618 forms and sends the system configuration information to memory estimator service 604. Memory estimator service 604 maintains registration repository 620 for storing the received information, including the system configuration information from boot configuration 602. Repository 620 may be implemented in any suitable form and in any suitable location such that repository 620 is accessible to and usable in memory estimator service 604 in the manner of an embodiment.

Based on the system configuration information received from boot configuration 602, memory estimator service 604 identifies the components of the operating system that have to be loaded during the boot process. The components may include necessary modules, necessary extensions, and even optional modules or extensions as specified in the system configuration information.

Memory estimator service 604 also identifies ancestry of such components. Memory estimator service 604 stores the list of components and their ancestry in repository 620.

Separately, when the data processing system is operational, such as after a previous boot up, modified forms of the various operating system components, such as component 606, register with memory estimator service 604. Memory estimator service 604 stores the registration information in repository 620 and uses the registration information for estimating the boot-time memory requirements for a subsequent execution of the boot process.

As depicted, component 606 includes memory estimation API 622, which component 606 uses to communicate the registration information to memory estimator service 604. In one embodiment, component 606 may include information 624 identifying component 606's dependencies. Accordingly, component 606 may communicate the dependency information together with the registration information to memory estimator service 604. Memory estimator service 604 may store in repository 620 not only the registration from component 606, but also component 606's dependencies if available in the registration information.

For a subsequent boot up of the data processing system, such as after a reconfiguration of the data processing system, memory estimator service 604 looks up repository 620 to form a list of components and their ancestry needed in the subsequent boot up. Using the list, and the registration information (and any dependency information), memory estimator service 604 identifies component 606 as being needed for the boot up and sends a query to component 606. The query from memory estimator service 604 to component 606 is similar to query 510 in FIG. 5.

Component 606 may either store or compute memory requirement 626, which is representative of component 606's memory requirement during boot-time. In response to receiving the query from memory estimator service 604, component 606 sends component 606's boot-time memory requirement to memory estimator service 604.

Memory estimator service 604 receives the boot-time memory requirements from all the components and their dependencies or ancestry on the list in a similar manner. Memory estimator service 604 calculates the total boot-time memory requirement but summing up the memory requirements of all the components and their dependencies or ances-try on the list. Comparing the total boot-time memory requirement with amount of real memory 616 received in the system configuration information, memory estimator service 604 determines whether the subsequent boot process will succeed or fail. Memory estimator service 604 provides a result, optionally with the total boot-time memory requirement, to API 618. The result received at API 618 may cause boot image construction code 608 to either produce a boot image or generate a notification as described with respect to FIG. 4.

Figure 7:
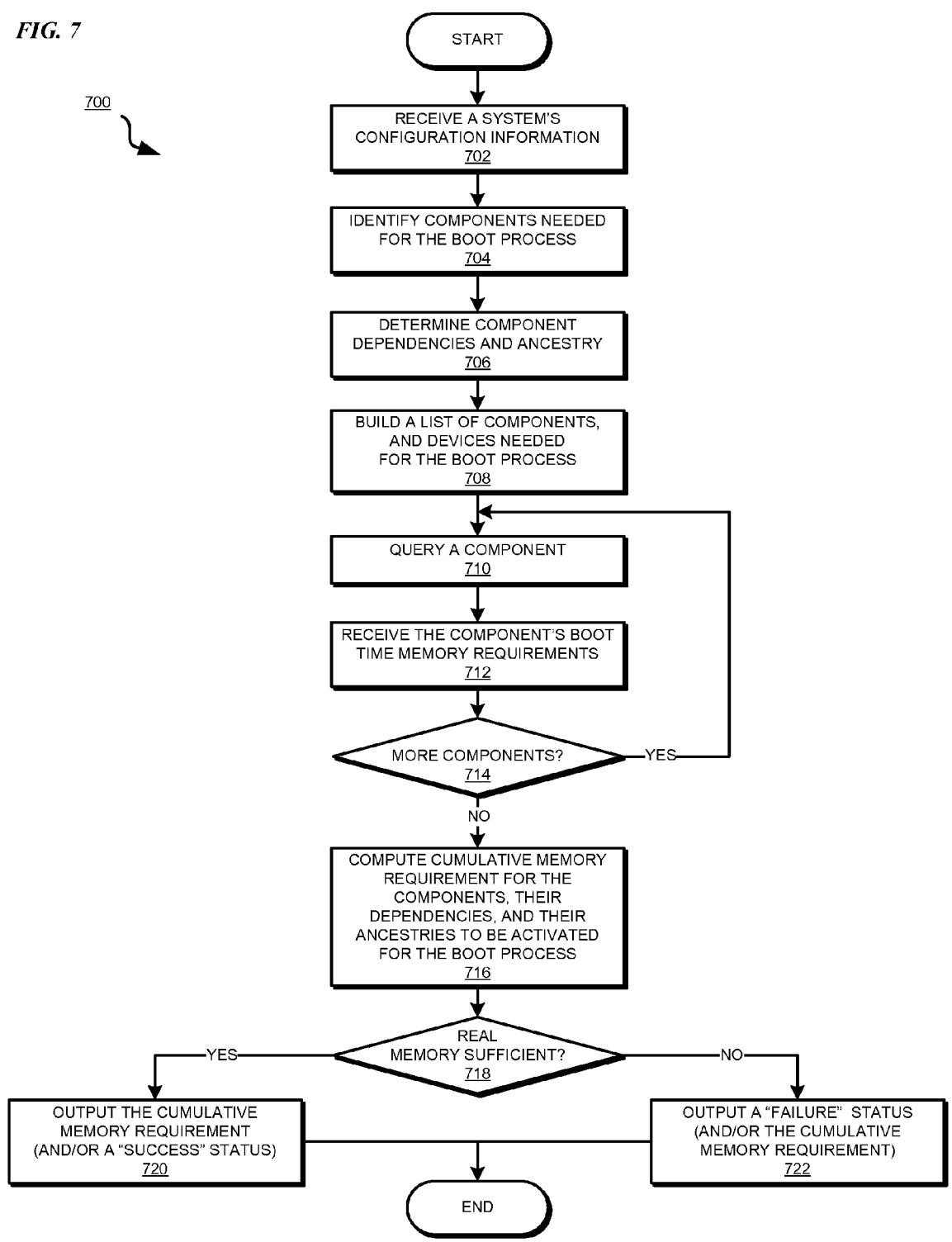
FIG. 7 depicts a flowchart of a process of estimating a boot-time memory requirement in accordance with an illustrative embodiment.

With reference to FIG. 7, this figure depicts a flowchart of a process of estimating a boot-time memory requirement in accordance with an illustrative embodiment. Process 700 may be implemented in a memory estimator application such as memory estimator application 212 in FIG. 2, or in a service-oriented embodiment thereof, such as in memory estimator service 604 in FIG. 6.

Executing process 700, the memory estimator application receives a data processing system's system configuration information (block 702). Based on the system configuration information, the memory estimator application identifies the components that will be needed for booting up the data processing system (block 704).

The memory estimator application determines each component's dependencies or ancestry, if any (block 706). The memory estimator application builds a list of components and devices that will be needed for the boot process (block 708). The memory estimator application queries a component for the component's boot-time memory requirement (block 710). The memory estimator application receives the component's boot-time memory requirements (block 712).

The memory estimator application determines whether more components on the list remain to be queried in a similar manner (block 714). If more components have to be queried ("Yes" path of block 714), process 700 returns to block 710, and the memory estimator application queries another component according to block 710.

If no more components remain to be queried ("No" path of block 714), the memory estimator application computes the cumulative boot-time memory requirement for the components, their dependencies, and their ancestry to be activated during the boot process (block 716). The memory estimator application determines whether the real memory configured in the data processing system is sufficient for the memory requirement calculated (block 718).

If the available real memory is sufficient ("Yes" path of block 718), the memory estimator application outputs the cumulative boot-time memory requirement, a "success" status indicating that the boot process will not fail due to real memory deficiency, or both (block 720). If the available real memory is insufficient ("No" path of block 718), the memory estimator application outputs the cumulative boot-time memory requirement, a "failure" status indicating that the boot process will fail due to a shortage of real memory at boot-time, or both (block 722). Optionally, the memory estimator application may also output the amount of available real memory and/or the amount of memory deficiency that prevents a successful boot up. Process 700 ends thereafter.

Figure 8:
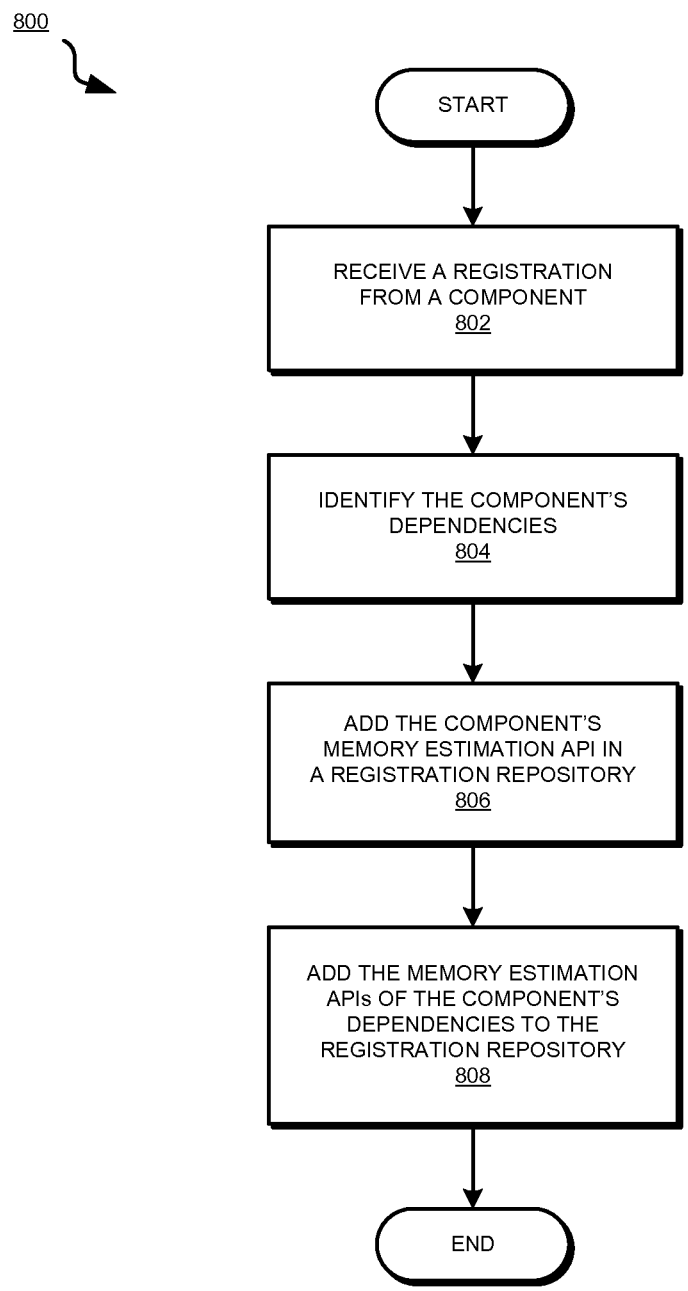
FIG. 8 depicts a flowchart of a process of identifying boot-time memory participants in accordance with an illustrative embodiment.

With reference to FIG. 8, this figure depicts a flowchart of a process of identifying boot-time memory participants in accordance with an illustrative embodiment. Process 800 may be implemented in a memory estimator application, such as memory estimator application 212 in FIG. 2, or in a service-oriented embodiment thereof, such as in memory estimator service 604 in FIG. 6.

Executing process 800, the memory estimator application receives a registration from a component (block 802). The memory estimator application identifies the component's dependencies, if available in the registration (block 804). The memory estimator application adds the component's memory estimation API to a registration repository (block 806). The memory estimator application adds the memory estimation APIs of each of the component's dependencies to the repository, when a dependency's API is available (block 808). Process 800 ends thereafter.

Figure 9:
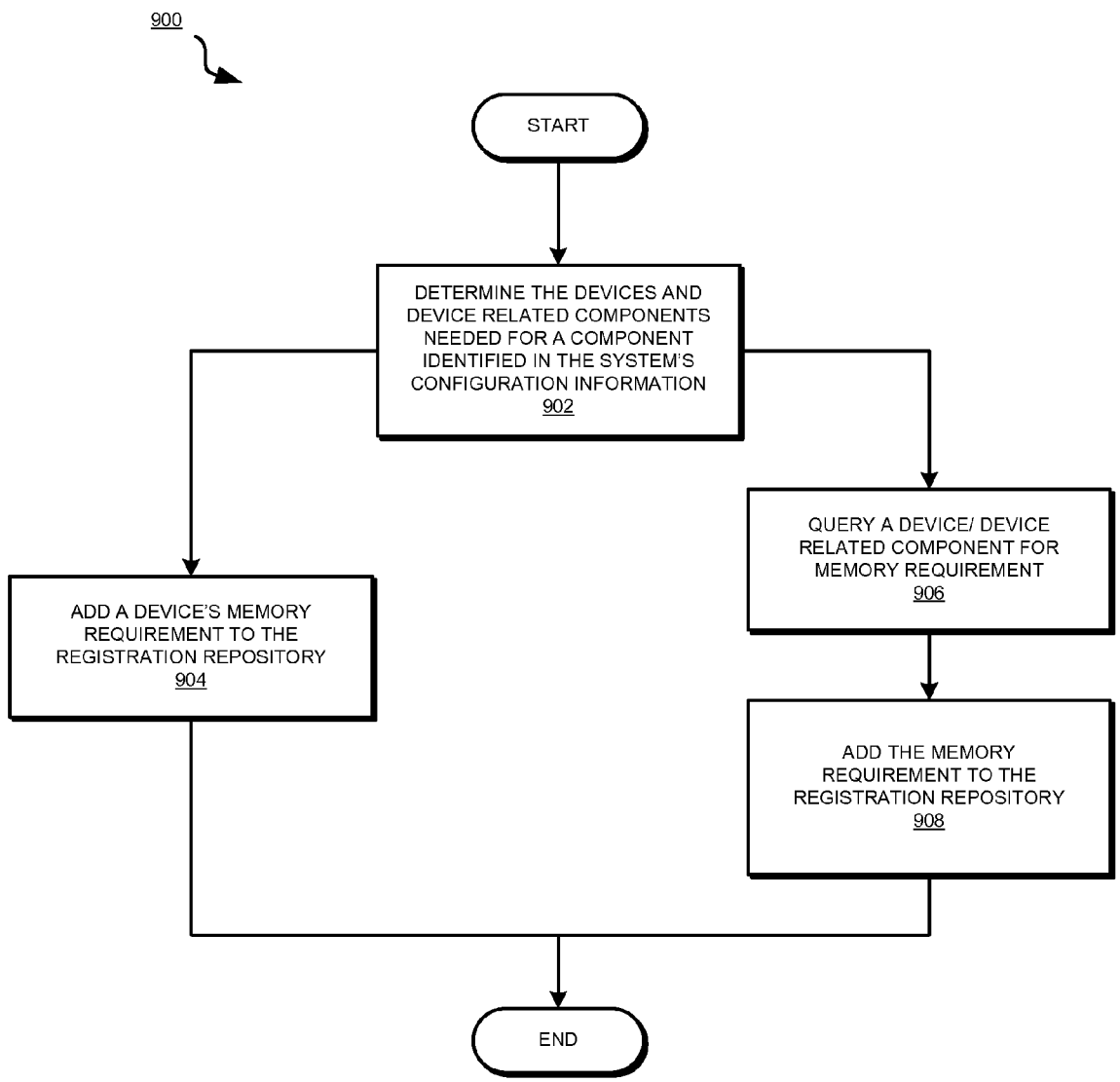
FIG. 9 depicts a flowchart of a process of identifying a boot-time memory participant's ancestry in accordance with an illustrative embodiment.

With reference to FIG. 9, this figure depicts a flowchart of a process of identifying a boot-time memory participant's ancestry in accordance with an illustrative embodiment. Process 900 may be implemented in a memory estimator application, such as memory estimator application 212 in FIG. 2, or in a service-oriented embodiment thereof, such as in memory estimator service 604 in FIG. 6.

Executing process 900, the memory estimator application determines the devices and device-related components needed for loading a component identified in a data processing system's system configuration information, such as from the component's ancestry information (block 902). The memory estimator application performs one or both of blocks 904 and 906 as may be needed in a given implementation. For a device whose memory requirement information is known, the memory estimator application adds the device's boot-time memory requirement to the registration repository (block 904). For a device whose memory requirements may not be known, and which has a memory estimator API according to an embodiment implemented therein, the memory estimator application queries the device or device-related component, such as a device driver, for the device's boot-time memory requirement (block 906). The memory estimator application adds the memory requirement information received in response to the query of block 906 to the registration repository (block 908). Process 900 ends thereafter.

The various embodiments, block diagrams, flowcharts, and examples are described using one API only as an example. An embodiment is not intended to imply a limitation on the invention that only one API may be created per component. Furthermore, an API may be similarly associated with a device, such as by modifying a component associated with the device, e.g., a device driver.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a method, system, and computer program product are provided in the illustrative embodiments for estimating boot-time memory requirement in a data processing system. Using an embodiment of the invention, a determination can be made before executing the data processing system's boot process whether the boot process will succeed or fail due to any real memory shortage. Such a determination according to an embodiment is of a higher accuracy and reliability as compared to any estimates produced using a prior art method.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for estimating boot-time memory requirement in a data processing system, the method comprising:
    the data processing system identifying, using system configuration information associated with the data processing system, a set of components needed for booting up the data processing system;
    the data processing system determining an ancestry of a component identified in the set of components, the component including a memory estimator program, wherein the ancestry of the component is a set of devices that must be activated as a consequence of needing the component to boot up the data processing system, wherein the ancestry includes a device of the data processing system needed to boot up the data processing system;
    the data processing system receiving, using the memory estimator program of the component, a boot-time memory requirement of the component;
    the data processing system calculating a total boot-time memory requirement; and
    the data processing system determining whether an amount of real memory of the data processing system satisfies the total boot-time memory requirement.

2. The method of claim 1, further comprising:
    the data processing system sending an indication of failure responsive to the total boot-time memory requirement being less than the amount of real memory of the data processing system.

3. The method of claim 1, wherein the calculating further comprises:
    the data processing system adding (i) a boot time memory requirement of each component identified in the set of components, (ii) a boot time memory requirement of each dependency of each component identified in the set of components, and (iii) a boot time memory requirement of an ancestry of each component identified in the set of components, the adding resulting in the total boot-time memory requirement.

4. The method of claim 1, further comprising:
    the data processing system receiving the system configuration information from boot image construction code, wherein the amount of real memory in the data processing system is identified in the system configuration information.

5. The method of claim 1, further comprising:
    the data processing system registering the component, the registering including storing an identifier of the memory estimator program of the component in a registration repository.

6. The method of claim 1, wherein a component identified in the set of components is a module of an operating system of the data processing system.

7. The method of claim 1, wherein the component has a dependency on a second component such that the component requires the second component for the component's operation, wherein the dependency of the component identifies the second component, the second component not being a member of the set of components, and wherein the method further comprises:
    the data processing system registering the second component, the registering including storing an identifier of a memory estimator program of the second component in a registration repository.

8. The method of claim 1, further comprising:
    the data processing system registering the device, the registering including storing an identifier of a memory estimator program of a third component associated with the device in a registration repository, wherein the third component associated with the device is modified to include the memory estimator program, the memory estimator program being usable to receive a boot-time memory requirement of the device.

9. A computer program product comprising one or more computer-readable tangible storage devices and computer-readable program instructions which are stored on the one or more storage devices and when executed by one or more processors perform the method of claim 1.

10. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

11. A computer program product for estimating boot-time memory requirement in a data processing system, the computer program product comprising one or more computer-readable tangible storage devices, and program instructions stored on at least one of the one or more storage devices, the program instructions comprising:

program instructions to identify, using system configuration information associated with the data processing system, a set of components needed for booting up the data processing system;

program instructions to determine an ancestry of a component identified in the set of components, the component including a memory estimator program, wherein the ancestry of the component is a set of devices that must be activated as a consequence of needing the component to boot up the data processing system, wherein the ancestry includes a device of the data processing system needed to boot up the data processing system;

program instructions to receive, using the memory estimator program of the component, a boot-time memory requirement of the component;

program instructions to calculate a total boot-time memory requirement; and program instructions to determine whether an amount of real memory of the data processing system satisfies the total boot-time memory requirement.

12. The computer program product of claim 11, further comprising:

program instructions to send an indication of failure responsive to the total boot-time memory requirement being less than the amount of real memory of the data processing system.

13. The computer program product of claim 11, wherein the program instructions to calculate the total boot-time memory requirement add (i) a boot time memory requirement of each component identified in the set of components, (ii) a boot time memory requirement of each dependency of each component identified in the set of components, and (iii) a boot time memory requirement of an ancestry of each component identified in the set of components, the adding resulting in the total boot-time memory requirement.

14. The computer program product of claim 11, further comprising:

program instructions to receive the system configuration information from boot image construction code, wherein the amount of real memory of the data processing system is identified in the system configuration information.

15. The computer program product of claim 11, further comprising:

program instructions to register the component, the registering including storing an identifier of the memory estimator program of the component in a registration repository.

16. The computer program product of claim 11, wherein a component identified in the set of components is a module of an operating system of the data processing system.

17. The computer program product of claim 11, wherein the component has a dependency on a second component such that the component requires the second component for the component's operation, wherein the dependency of the component identifies the second component, the second component not being a member of the set of components, and wherein the method further comprises:

program instructions to register the second component, the registering including storing an identifier of a memory estimator program of the second component in a registration repository.

18. The computer program product of claim 11, further comprising:

program instructions to register the device, the registering including storing an identifier of a memory estimator program of a third component associated with the device in a registration repository, wherein the third component associated with the device is modified to include the memory estimator program, the memory estimator program being usable to receive a boot-time memory requirement of the device.

19. The computer program product of claim 11, wherein the program instructions are stored in the one or more computer-readable tangible storage devices of a data processing system, and wherein the program instructions are transferred over a network from a remote data processing system.

20. The computer program product of claim 11, wherein the program instructions are stored in the one or more computer-readable tangible storage devices of a server data processing system, and wherein the program instructions are downloaded over a network to a remote data processing system for use in a computer-readable tangible storage device associated with the remote data processing system.

21. A computer system for estimating boot-time memory requirement in a data processing system, the computer system comprising one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to identify, using system configuration information associated with the data processing system, a set of components needed for booting up the data processing system;

program instructions to determine an ancestry of a component identified in the set of components, the component including a memory estimator program, wherein the ancestry of the component is a set of devices that must be activated as a consequence of needing the component to boot up the data processing system, wherein the ancestry includes a device of the data processing system needed to boot up the data processing system;

program instructions to receive, using the memory estimator program of the component, a boot-time memory requirement of the component;

program instructions to calculate a total boot-time memory requirement; and program instructions to determine whether an amount of real memory of the data processing system satisfies the total boot-time memory requirement.

22. The computer system of claim 21, further comprising:

program instructions to send an indication of failure responsive to the total boot-time memory requirement being less than the amount of real memory of the data processing system.

23. The computer system of claim 21, wherein the program instructions to calculate the total boot-time memory requirement add (i) a boot time memory requirement of each component identified in the set of components, (ii) a boot time memory requirement of each dependency of each component identified in the set of components, and (iii) a boot time memory requirement of an ancestry of each component identified in the set of components, the adding resulting in the total boot-time memory requirement.

* * * * *